United States Patent [19]

Rowlette

[11] Patent Number: 4,539,268
[45] Date of Patent: Sep. 3, 1985

[54] SEALED BIPOLAR MULTI-CELL BATTERY

[75] Inventor: John J. Rowlette, Monrovia, Calif.

[73] Assignee: California Institute of Technology, Pasadena, Calif.

[21] Appl. No.: 505,393

[22] Filed: Jun. 17, 1983

Related U.S. Application Data

[63] Continuation-in-part of Ser. No. 279,841, Jul. 2, 1981, abandoned.

[51] Int. Cl.³ .......................... H01M 2/12; H01M 2/28
[52] U.S. Cl. ...................................... 429/54; 429/152; 429/160
[58] Field of Search .................. 429/54, 60, 122, 123, 429/149, 150, 151, 152, 153, 154, 155, 160, 161, 163, 210

[56] References Cited

U.S. PATENT DOCUMENTS

| | | | |
|---|---|---|---|
| 608,714 | 8/1898 | Rively | 429/161 |
| 1,658,315 | 2/1928 | Wheeler | 429/149 |
| 1,663,193 | 3/1928 | Danna | 429/161 |
| 3,560,267 | 2/1971 | Guilliams | 429/54 |
| 3,589,942 | 6/1971 | Leitz, Jr. et al. | 429/26 |
| 3,723,181 | 3/1973 | Oakley | 429/152 |
| 3,728,158 | 4/1973 | Poe et al. | 429/88 |
| 3,846,175 | 11/1974 | Desai | 429/60 |
| 4,124,746 | 11/1978 | Nordblom et al. | 429/210 |
| 4,125,680 | 11/1978 | Shropshire et al. | 429/4 |
| 4,211,833 | 7/1980 | Einstein | 429/149 |

Primary Examiner—Donald L. Walton
Attorney, Agent, or Firm—Marvin E. Jacobs

[57] ABSTRACT

A low maintenance battery comprises a sealed casing (102) having a cavity (204) receiving a stack (108) of monopolar and bipolar plates (110, 112) interspersed with mats (122) of fiberglass felt immobilizing electrolyte and forming a gas path for diffusion of oxygen to the negative electrode (112). The casing contains a single, resealable vent (202). During charging, oxygen generated at the positive plate (110) diffuses through the mat (122) and decomposes at the negative plate (112). The negative plate (112) has a larger capacity than the positive plate (110) to prevent evolution of hydrogen. Voltage potential is increased or decreased by placing one or more bipolar plates (120) in series relation between alternating positive and negative monopolar plates that are connected in parallel to respective positive and negative battery terminals (104, 106). The monoplates (110, 112) are connected in parallel to respective positive and negative battery terminals (104, 106) by way of bus plates (114, 116, 130, 132). The resealable vent permits operation by way of the oxygen cycle which prevents loss of electrolyte. The vent prevents invasion of oxygen from the ambient to discharge negative plates.

18 Claims, 9 Drawing Figures

Fig. 5.

| NEGATIVE ACTIVE MATERIAL | 58 / 54 |
| LEAD PLATING | |
| EPOXY GRAPHITE IMPREGNATED | 76 |
| TITANIUM 0.002" THICK | 50 |
| EPOXY GRAPHITE IMPREGNATED | 48 |
| LEAD PLATING | 52 |
| NEGATIVE ACTIVE MATERIAL | 56 |

| POSITIVE ACTIVE MATERIAL | 70 / 66 |
| LEAD STRIPES OVER 1/10 OF SURFACE | 80 |
| TITANIUM 0.002" | 64 |
| LEAD STRIPES OVER 1/10 OF SURFACE | 68 |
| POSITIVE ACTIVE MATERIAL | 72 |

SEALED BIPOLAR MULTI-CELL BATTERY

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

DESCRIPTION

CROSS-REFERENCE TO RELATED APPLICATION

This application is a continuation-in-part of copending application Ser. No. 279,841, filed July 2, 1981 now abandoned.

TECHNICAL FIELD

The present invention relates generally to storage of secondary batteries. More specifically, the present invention relates to an improved, low maintenance, lightweight, sealed, bipolar, lead-acid battery which is capable of producing either high or low voltage.

BACKGROUND ART

The largest single application of lead-acid storage batteries is for the starting, lighting, and ignition of automobiles, trucks and buses. These batteries are charged automatically from a generator driven by the engine while it is running and they supply power for the lights while the engine is shut-down and for ignition and cranking when the engine is started. Lead-acid storage batteries are also widely used in aircraft and boats with virtually unlimited applications also existing in non-motive situations.

Lead-acid batteries contain a series of lead-acid cells, each including a positive plate containing positive, active material, such as lead dioxide, and a negative plate containing negative, active material, such as sponge lead immersed in an electrolyte solution, typically dilute sulfuric acid. The respective positive and negative plates are connected in parallel with the power or current output of a cell being determined by the number and size of the plates. The open circuit potential developed between each pair of positive and negative plates is about two volts. Since the plates are connected in parallel, the combined potential for each cell will be also about two volts regardless of the number of plates utilized in the cell. One or more cells are then serially connected to provide a battery of desired voltage. Common low voltage batteries are 6 volt batteries having three serially connected cells and 24 volt batteries with 12 serially connected cells.

The positive and negative plates are usually oriented vertically in a horizontal stacked relationship. As a result of this vertical orientation, electrolyte stratification commonly occurs vertically along the plate surfaces. This results in diminishing of battery performance. Some attempts have been made to prevent electrolyte stratification, such as stirring of the electrolyte by various mixing systems. These mixing systems are not only cumbersome, but are expensive and subject to failure during the life of a particular battery.

Another problem with lead-acid batteries is their limited lifetime due to shedding of the active materials from the positive and negative plates. Pasted plate lead-acid batteries are by far the most common type of lead-acid battery. Typically, a paste of lead oxide is applied to the surfaces of the positive and negative grids. When an initial electric charge is applied to the plates, the lead oxide paste on the positive grid is oxidized to lead dioxide while the lead oxide on the negative plate is reduced. During continued operation of the lead-acid battery, shedding or flaking of the deposited lead paste occurs. The flakes of material fall down between the vertically oriented plates and accumulate in a well on the battery bottom. After a period of time, sufficient flakes accumulate on the battery bottom to short circuit the negative and positive grids resulting in a dead battery cell and shortened battery life.

In the past, lead-acid batteries have been inherently rather heavy due to the use of lead in constructing the plates. Recently, attempts have been made to produce light-weight, lead-acid batteries especially for use in aircraft, electric cars and other vehicles where weight is an important consideration. Emphasis has been placed on producing thinner plates made from lightweight materials used in place of or in combination with lead. Although the thinner, lightweight plates are beneficial in reducing battery weight, they present problems in regards to providing a cell structure which is sufficiently strong and rigid to prevent structural failure during normal use. The thinner plates allow the use of more plates for a given weight volume, thus increasing the power density.

In my co-pending application, Ser. No. 268,484, filed May 29, 1981, now U.S. Pat. No. 4,405,697, entitled "IMPROVED LEAD-ACID BATTERY," a lightweight battery is described which includes a plurality of horizontally oriented, vertically stacked alternating positive and negative monoplates or grids. Tabs are provided extending from two opposite edges of the plates or grids along the total length of the grids on both sides thereof. The negative and positive plates are stacked so that two positive tabs extend from the cell or grid stack on sides adjacent the two negative tabs. The common tabs on each side of the grid stack are welded together in parallel to form four bus bars or plates extending vertically up the cell sides. The bus bars not only greatly reduce electrical resistance in the battery cell or grid stack, but additionally provide rigidity and strengthening to the cell structure. Further, the horizontal orientation of the grids prevents the accumulation of flaked lead compounds at the battery bottom, since their downward movement is blocked by the glass mat containing the electrolyte placed between each set of positive and negative plates. Also, stratification of the electrolyte is avoided, since the electrolyte is confined and contained within the acid resistant glass mats by capillary action.

Although, the improved lead-acid battery disclosed in my co-pending application does away with active material flaking and electrolyte stratification while strengthening the battery structure, it would be desirable to provide a battery with different voltage potentials. In order to increase available voltage from my improved lead-acid battery, it is necessary to serially connect a number of cells together. This may not be desirable or convenient in providing a suitable high voltage lightweight battery, since to reach relatively high voltages, the number of serially connected cells necessary is large with a resultant undesirable increase in resistance and battery size.

It is also desirable to provide a low maintenance battery that does not require addition of water or electrolyte throughout its useful life. Sealed battery designs have been available in rolled configurations for sometime. There are also sealed lead-acid batteries having vertical plates. However, the sealed batteries are in fact an assemblage of sealed, individual cells. Since oxygen is generated during discharge, each cell must contain its own resealable vent. Furthermore, the individual cells develop different internal pressures leading to warping and buckling of the cell enclosure and of the battery casing.

STATEMENT OF THE INVENTION

A low maintenance, lightweight battery is provided in accordance with the invention. Shedding of electrolyte materials and stratification of electrolyte are avoided. Even though the lightweight electrode plates utilized are inherently weak, the battery construction of the invention is strong and reliable. Further, reliability is provided by disposing a multicell bipolar stack of horizontal plates in a common sealed chamber which avoids buckling, warping and unequal gassing of separate sealed cells. The single chamber construction of the invention also permits use of a single resealable vent rather than one per cell as required in the current design of sealed batteries. The bipolar plate battery construction of the invention is capable of operation both at low voltage and high voltage.

The battery construction of the invention includes a grid stack including a plurality of horizontal, conductive monoplates of opposite polarity. Positive monoplates contain a layer of positive, active material and negative monoplates contain a layer of negative, active material. A layer of oxygen gas permeable, electrolyte laden absorbent, compressible material is disposed between each set of monoplates. Bus bars connected to the edges of the plates provide structural support and electrical connection to the battery terminals. Bipolar groupings having positive ends and negative ends with an electric potential therebetween are disposed between the monoplates. The positive ends of the bipolar plate groupings are located adjacent the monoplates having negative-active material and the negative ends of the bipolar plate groupings are located adjacent the monoplates having positive active material. Each bipolar plate grouping includes one or more bipolar plates with electrolyte layers between the bipolar plates. The bipolar plates are electrically conductive so that electrical current is conducted perpendicularly through the plates resulting in a serial electrical connection. Since the bipolar plates are connected serially, the voltage potential of a given bipolar plate grouping may be varied easily and conveniently by simply varying the number of bipolar plates present in a bipolar plate grouping. The more bipolar plates present in any given bipolar plate grouping, the higher the voltage for that particular bipolar plate grouping.

The invention provides a reliable low-maintenance battery which eliminates loss of water by either evaporation or electrolysis. Lightweight materials are utilized and are structurally supported by being compressed in a stack and braced at the edges by the bussing means. Battery construction is simplified, since separate seals and vents for each cell are not required and higher reliability can be expected in the single cavity design of the invention. Versatility in output current or voltage is provided by variation of the number of monoplate sets or bipolar plates.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 5 is a schematic diagram of a preferred exemplary negative monopolar plate;

FIG. 6 is a schematic diagram of a preferred positive monopolar plate;

FIG. 7 is a partially schematic sectional view of a preferred exemplary battery in accordance with the present invention;

DETAILED DESCRIPTION OF THE INVENTION

The present disclosure of my copending application entitled "IMPROVED LEAD-ACID BATTERY", U.S. Ser. No. 268,484, filed May 29, 1981, is hereby incorporated by reference. The copending patent application discloses a lightweight battery construction which is based upon the vertical stacking of alternating positive and negative monopolar plates. The grid stack of alternating monopolates includes electrolyte layers dispersed between the monoplates. The electrolyte layers are contained within porous acid resistant materials, such as asbestos felt or glass felt. As a particular feature of that invention, tabs are provided extending from two opposite edges of the monoplates or grids and running the total length of the grids on opposite sides thereof. The corresponding tabs for positive and negative plates are welded or otherwise attached to a vertical plate to form bus bars when the grids are stacked. This provides high current carrying capacity to the battery terminals. The negative and positive plates are stacked so that the positive tabs extend from the cell or grid stack on sides adjacent the negative tabs. The common tabs on each side of the grid stack are welded together or otherwise connected to a common plate or bus bar to form four bus bars or plates extending vertically up the grid stack sides.

The present invention involves the placement of bipolar plate groupings in between the alternating monopolar plates to thereby increase the potential voltage available. The bipolar plate grouping is not connected to the bus bars, but is secured within the battery stack by suitable non-conductive means.

Figure 1:
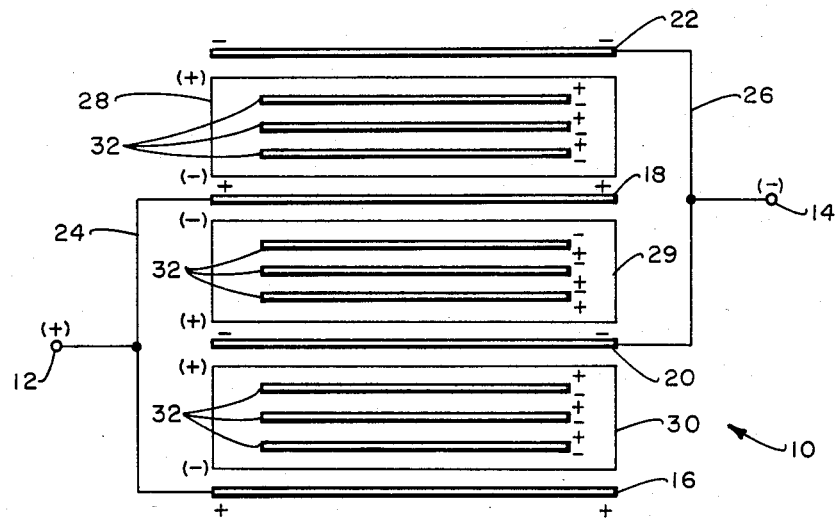
FIG. 1 is a schematic diagram of the series-parallel electrical connection of bipolar and monopolar plates in accordance with the present invention.

Referring now to FIG. 1, a schematic representation of the improvement of the present invention is shown. FIG. 1 schematically represents a bipolar battery 10 having a positive terminal 12 and a negative terminal 14. The battery 10 includes a monopolar grid or plate stack having two positive monopolar plates 16 and 18 and two negative monopolar plates 20 and 22. The preferred structure of the monopolar plates will be discussed later. The monopolar plates 16, 18, 20 and 22 are stacked vertically with suitable electrolyte layers (not shown) provided. The positive monopolar plates 16 and 18 are connected in parallel by bus bar (schematically shown at 24) to the positive terminal 12 to provide an electric potential of about eight volts with the electrical current being determined by the size of the plate 16 and 18. The negative monopolar plates are connected by way of bus bar 26 (shown schematically) to negative terminal 14 to also provide a voltage potential of about eight volts and a current varying depending upon size of the negative monopolar plates 20 and 22.

In accordance with the present invention, bipolar plate groupings 28, 29 and 30 are inserted between the monopolar plates 16, 18, 20 and 22. The bipolar plate groupings 28, 29 and 30 are positioned so that their positive ends are adjacent the negative monopolar plates 20 and 22 and their negative ends are adjacent the positive monopolar plates 16 and 18. The bipolar plate groupings 28, 29 and 30 include a series of vertically stacked bipolar plates 32. These bipolar plates 32, as will be described in detail later, are stacked vertically with suitable electrolyte layers provided between the bipolar plates 32 to provide a bipolar plate grouping having variable voltage depending upon the number of bipolar plates 32 present in a given grouping.

Figure 2:
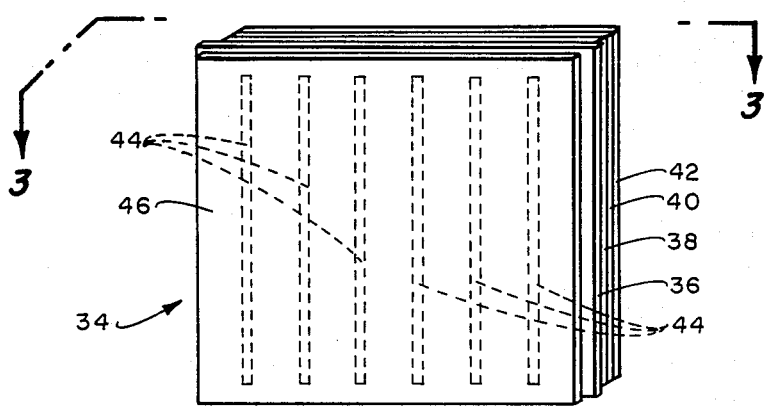
FIG. 2 is a preferred exemplary bipolar plate in accordance with the present invention.
Figure 3:
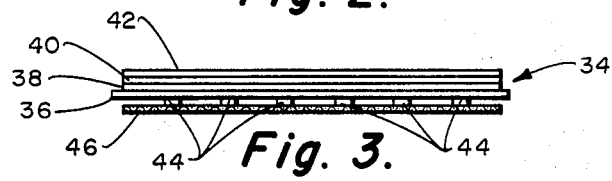
FIG. 3 is a top view of FIG. 2 taken in the 3—3 plane.
Figure 4:
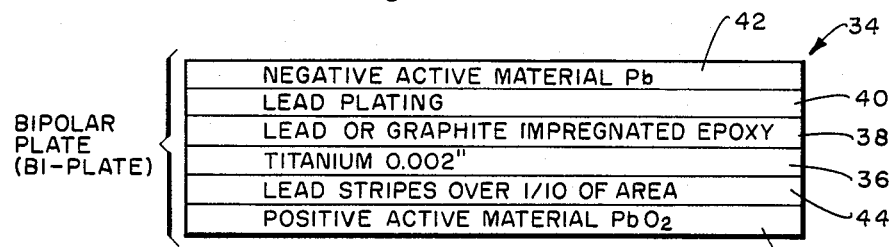
FIG. 4 is a schematic representation of preferred materials for the preferred bipolar plate shown in FIG. 2 and FIG. 3.

Referring now to FIGS. 2, 3 and 4, a preferred bipolar plate is shown generally at 34. The preferred bipolar plate 34 includes a central conductive plate or portion 36. The conductive portion 36 may be of any suitable lightweight conductive material; however, it is preferred that the conductive portion be made from titanium having a thickness of about 0.002 inch. In order to protect the top layer of the titanium, lead or graphite, impregnated epoxy is coated over the upper surface as indicated at 38. The epoxy layer should have sufficient lead or graphite impregnated therein to allow conductance of ions therethrough. The graphite or lead impregnated epoxy coating 38 is preferred to keep the electrolyte from the titanium and thereby prevent corrosion. Although epoxy is preferred, any other suitable acid resistant coating which is capable of being impregnated with graphite or lead and bound to titanium may be utilized. Metallic lead is then plated onto the conducting epoxy layer 38 and annealed to form lead plating layer 40. Preferably, the electroplated layer of lead 40 is approximately 0.001 inch thick. On top of the lead plating is placed a layer of a negative, active material 42. Preferably, the negative, active material is held in place by a suitable mesh screen (not shown). The preferred negative, active material is sponge lead. Other conventional types of negative, active material may also be used.

The above-described epoxy layer 38, lead plate layer 40 and negative, active material 42 form the negative half of the bipolar plate. The opposite side of the titanium conductive layer 36 is plated over approximately one-tenth of the titanium plate surface area with lead. Preferably, the lead is plated in the form of lead strips 44. A screen 46 is attached to the lead stripped surface of the titanium plate 36. The screen 46 contains positive, active material which is preferably lead dioxide. The lead strips 44 and screen 46 containing positive, active material form the positive half of the bipolar plate 34.

FIG. 5 is a graphic representation of a preferred negative monopolar plate. The negative monopolar plate 61 is the same as the bipolar plate 34, except that the negative half of the bipolar plate 34 is provided on both sides of the central titanium plate 48. A central lightweight, conductive, electrolyte impervious plate, such as titanium plate 48 is coated with a coating 50, 52 of epoxy impregnated with graphite on both sides, which in turn is coated with lead plating 54 and 56 followed by an outer layer of negative, active material 58 and 60 which is preferably held in place by conventional mesh material, not shown. Other negative monopolar plates are possible with the main criteria being that the plate is capable of conducting ions from the negative, active material on both sides through a central conducting plate to suitable bus bars.

FIG. 6 is a graphic representation of a preferred positive monopolar plate 62. The positive monopolar plate is the same as the bipolar plate 34, except that lead strips and positive, active material are present on both sides of the conductive titanium plate. A positive monopolar plate is provided having a central titanium conductive layer 64 with mesh screens 70 and 72 containing positive, active material applied over the lead strips 66 and 68.

The negative monopolar plate 61 is provided with tabs 74 and 76 extending outward from opposite sides of the titanium plate 48. These tabs are provided in accordance with my copending application for connection to vertically extending bus bars in order to connect the negative monopolar plates of a given battery in parallel to the bus bar. The tabs may extend along the entire side of a given titanium plate 48 and are preferably integrally formed by bending outward portions of the titanium plate to form desired tabs. Likewise, positive monopolar plate 62 is provided with tabs 78 and 80 which are also connected to a suitable vertically extending bus bar.

Although many different sizes and shapes of bipolar and monopolar plates are possible, rectangular plates having dimensions of 7 inches by 10 inches are preferred. Of course, this dimension may be varied widely according to different applications and requirements.

Figure 8:
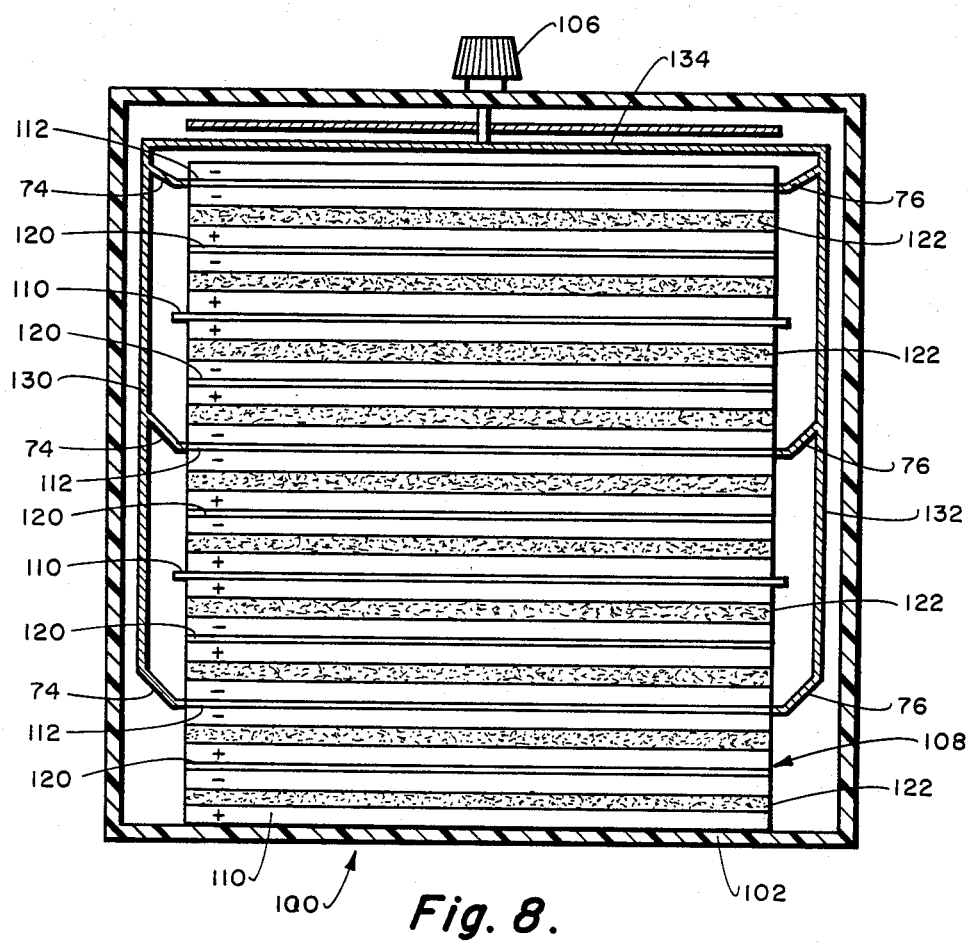
FIG. 8 is a sectional view taken along line 8—8 of FIG. 7.

FIGS. 7 and 8 show a partial schematic representation of a preferred battery in accordance with the present invention. In FIG. 7, a battery shown generally at 100, includes a battery case 102, a positive terminal 104 and a negative terminal 106. A grid stack 108 is formed of alternatively disposed positive monoplates 110 and negative monoplates 112. The positive monoplates 110 are formed with tabs 78 and 80 connected to bus bars 114 and 116, respectively. The bus bars 114 and 116 are suitably conductive plates which cover the entire side of the grid stack 108 and extend upwardly to the top of the grid stack 108. The left bus bar 114 is connected directly to the positive terminal 104, while the right bus bar 116 is connected to the positive terminal 104 by way of conductive plate or line 118. In accordance with the present invention, bipolar plates 120 are schematically shown interposed between the alternating positive and negative monoplates 110 and 112. Although for simplicity, the preferred battery is shown with only one bipolar plate or biplate 120 between each monoplate, it is to be realized that the number of bipolar plates may be increased to any desired number by suitable series stacking to achieve the desired voltage.

Further in accordance with this preferred battery 100, layers of suitable electrolyte 122 are provided as is necessary to provide operation of the cell. Preferably the electrolyte is standard aqueous sulfuric acid electrolyte, which is immobilized by being impregnated within acid-resistant material, such as glass or asbestos felt.

Referring now to FIG. 8, the tabs 74 and 76 extending out from the negative monoplates 112 are connected to bus bars or plates 130 and 132, respectively. The bus plates 130 and 132 are sufficiently wide and high to cover the two opposite sides of the grid stack to which they are adjacent. The negative bus plates are connected to the negative terminal 106 by way of conductive plate 134.

Figure 9:
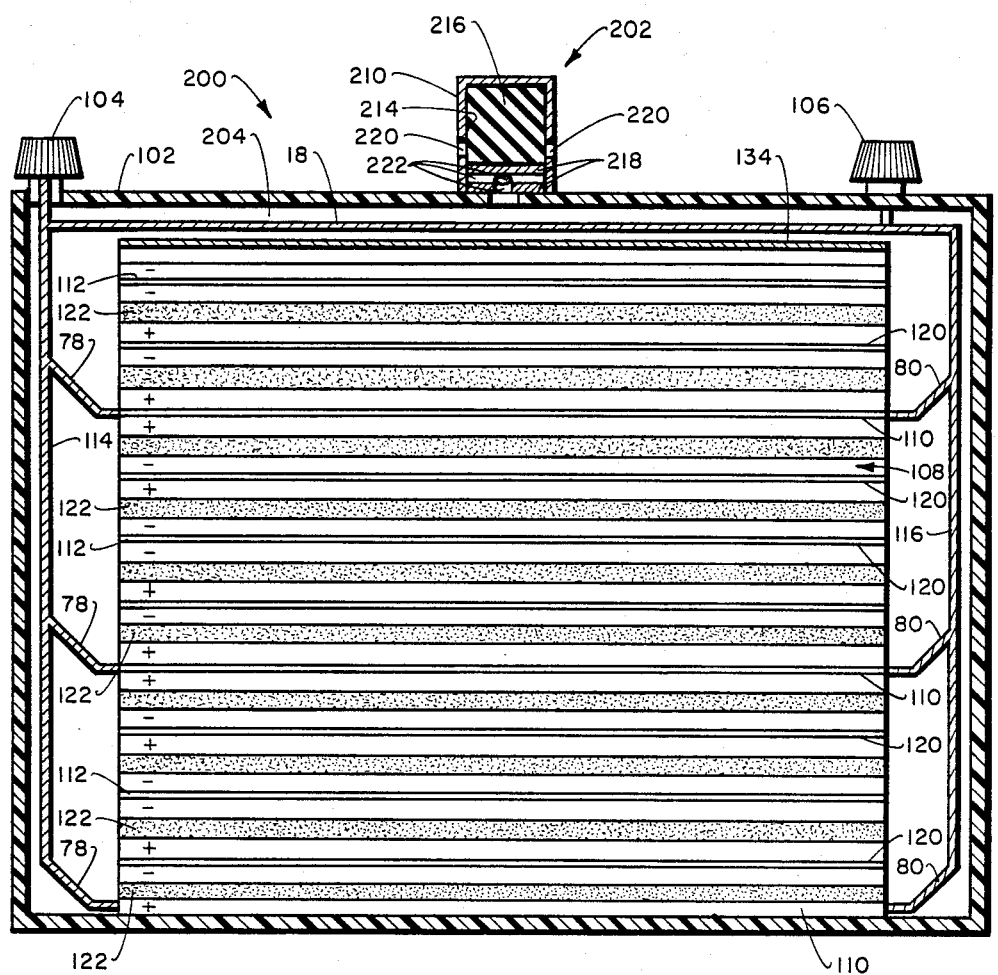
FIG. 9 is a schematic view of a sealed battery in accordance with the invention.

FIG. 9 illustrates a sealed version of the battery illustrated in FIGS. 7 and 8 with all like parts labelled the same. The sealed battery 200 contains a low pressure resealable vent 202 mounted on the battery in communication with the common headspace 204. The vent can be mounted on the top or sides, but is conveniently located on the top since it is less likely to be damaged or sheared in this location. The stack 108 of plates containing a plurality of cells is housed in the common chamber. The cells are all in gas communication, so that all cells should behave in the same manner.

The sealed battery is designed so that only oxygen gas is produced during discharge and that this gas is electrochemically dissociated at the opposed negative electrode at a rate sufficient to prevent excessive pressure buildup. A controlled, low pressure can be tolerated by the stack and is desirable to increase the diffusion rate of the gas across the electrolyte mats 122. Therefore, the resealable vent 202 is set to have a release pressure of less than 25 psi, usually from 5 to 15 psi, typically 10 psi. The mat participates in the oxygen cycle and in the maintenance free design of the battery.

The porous mat absorbs and immobilizes the sulfuric acid electrolyte between adjacent plates and prevents stratification. The amount and concentration of electrolyte are controlled such that sufficient acid is available to achieve rated capacity without completely saturating the porous separator. Enough pores remain free of liquid so that a tortuous, continuous path of pores is available for oxygen to move to the negative electrode and be reduced there to water according to the following reaction:

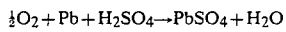

$\frac{1}{2}O_2 + Pb + H_2SO_4 \rightarrow PbSO_4 + H_2O$

The oxygen recombination rate is high enough to efficiently reduce oxygen gas at the pressure within the sealed casing. The porous mat has an open pore volume capacity exceeding the volume of electrolyte by at least about 10 percent. The most commonly utilized material is composed of borosilicate glass fibers having mean diameters of about 0.5 to 2.0 microns formed into a felt by a papermaking process. The felt is highly porous ( 80 to 90%). Electrolyte readily wicks through the mat but particles of active material are trapped and held in place. The battery design of the invention further includes negative plates having a capacity greater than the positive plates by at least 5% to prevent hydrogen gas being generated by the battery.

The vent 202 must be of a resealable design. Otherwise oxygen from the surrounding ambient would enter the cell and would be readily scavenged by the negative electrode and be reduced. This would cause the negative electrode to self-discharge. The resealable vent should be constructed of acid resistant materials. A suitable vent 202 comprises a housing 210 having a cavity 214 containing a deformable rubber cylinder 216 mounted on a piston 218. The cylinder normally blocks vent holes 220. When the internal pressure in the headspace exceeds the design limit, the piston 218 moves upwardly compressing the cylinder 216 and communicating the vent holes 220 with the headspace through a passage 222 in the piston 218. The cylinder should not be able to move downwardly so that the battery can operate at times under negative pressure without accidental ingress of ambient oxygen.

Although the present invention has been described by reference to a preferred battery construction in which preferred bipolar and monopolar plates have been disclosed, it is to be realized that other suitable mono and bipolar plate constructions are possible. For example, a suitable negative monopolar plate may be made from any central conductive layer, such as lead or a conductive lead composite which has negative, active material on opposite sides thereof. Further, a suitable positive monoplate could be made from a central lead conductive plate having positive, active material on opposite sides thereof. Although these particular configurations for the monopolar plates are possible in accordance with the present invention, they may not be desirable for lightweight battery application due to the increased weight experienced with lead plates.

It is to be realized that only preferred embodiments of the invention have been described and that numerous substitutions, modifications and alterations are permissible without departing from the scope of the invention as defined in the claims.

I claim:

1. A battery having a positive terminal and a negative terminal comprising:

a plurality of through-conductive, stacked, bipolar plate groupings having positive ends and negative ends, said bipolar plate groupings being stacked with positive ends adjacent each other and negative ends adjacent each other;

a positive conductive, electrolyte-impermeable monoplate located between adjacent negative plate grouping ends having positive active material on both sides facing said negative plate grouping ends and being separated from said negative plate grouping ends on both sides by an electrolyte layer confined and contained within an acid-resistant mat;

a negative conductive, electrolyte-impermeable monoplate located between adjacent positive plate grouping ends having negative active material on both sides facing said positive plate grouping ends and being separated from said positive plate grouping ends on both sides by an electrolyte layer confined and contained within an acid-resistant mat;

means for connecting said positive monoplates to said positive battery terminal; and means for connecting said negative monoplates to said negative battery terminal whereby each of said bipolar plate groupings is connected in electrical energy communication with said terminals.

2. A battery according to claim 1 wherein said bipolar plate groupings include one or more bipolar plates having a central conductive, electrolyte-impermeable plate portion with negative active material on a first side of said conductive plate and positive active material on a second side of said conductive plate, said bipolar plates being stacked with the first side of each plate facing in the same direction wherein said bipolar plate stack terminates at said plate grouping negative end with a negative first side of a bipolar plate and terminates at said plate grouping positive end with a positive second side of a bipolar plate, said bipolar plate grouping further including an electrolyte layer confined and contained within an acid resistant mat between each of said bipolar plates whereby electrical current generated during discharge of said battery is conducted perpendicularly through said plates from the positive plate grouping end to the negative plate grouping end.

3. A bipolar battery according to claim 2 wherein said central, conductive plate in the bipolar plate is a lightweight material capable of conducting an electrical charge perpendicularly therethrough between said positive and negative active materials.

4. A battery according to claim 2 wherein said mat is a glass mat.

5. A battery according to claim 3 wherein said lightweight material is a metal capable of conducting an electrical charge perpendicularly therethrough and between said positive and negative active materials.

6. A battery according to claim 5 in which said metal comprises titanium.

7. A battery according to claim 6 wherein a protective layer is provided on the surface of the titanium plate under said negative active material.

8. A battery according to claim 7 in which the protective layer is an epoxy resin containing a dispersion of conductive filler selected from graphite or lead.

9. A battery according to claim 5 wherein a conducting layer is interposed between said positive active material and said central metal plate in the form of thin lead stripes plated on said plate and in contact with said positive active material.

10. A bipolar battery according to claim 9 in which the positive active material is lead dioxide and the negative active material is metallic lead and the electrolyte is a solution containing sulfuric acid.

11. A lightweight, bipolar lead-acid battery comprising:

a grid stack formed of horizontally disposed, vertically stacked monopolar positive plates, monopolar negative plates and bipolar plates;

said grid stack including a plurality of bipolar plate groupings each including a plurality of bipolar plates having opposite polarity surfaces opposed to each other and containing an electrolyte-containing mat therebetween and having end surfaces facing a monopolar plate of opposite polarity with a layer of electrolyte containing mat therebetween;

said monopolar negative plates being formed of a central plate of lightweight material, a protective layer of acid-resistant conductive resin coated on each surface of the plate and a layer of negative active material provided on each of said protective layers;

said monopolar positive plates being formed of a central lightweight plate containing positive active material on each surface thereof;

said bipolar plates being formed of a central, lightweight plate of material having a protective layer of acid-resistant conductive resin on one surface thereof and a layer of negative active material on said coating and a layer of positive active material on the opposite surface of the central plate;

positive bus bar means on opposite sides of the grid stack for interconnecting said positive monopolar plates in parallel; and negative bus bar means on the remaining sides of the stack for interconnecting the negative monopolar plates in parallel and for structurally strengthening the stack.

12. An improved lead-acid battery comprising in combination:

a sealed casing defining a common cavity;

a resealable vent connected to said cavity;

a stack of electrolyte-impermeable horizontal plates received in said cavity comprising alternately disposed lightweight, positive monopolar plates and lightweight, negative monopolar plates having liquid electrolyte-laden porous mats therebetween defining a plurality of cells said mats having a volumetric capacity exceeding that of the electrolytes and an open pore structure from surface to surface permitting diffusion of oxygen and confining all the liquid electrolyte therein;

positive and negative terminals mounted on said casing; and bussing means connecting the plates to their respective terminals.

13. A battery according to claim 12 in which said stack further includes a plurality bipolar plates interspersed between said monopolar plates with opposite polarities facing each other.

14. A battery according to claim 13 in which said monopolar and bipolar plates are formed of a central, lightweight, electrolyte-impermeable conductive plate with layers of active material deposited on each side thereof.

15. A battery according to claim 14 in which the negative layers have more capacity than the positive layers.

16. A battery according to claim 15 in which the pore capacity of the mat exceeds the volume of the electrolyte by at least 10%.

17. A battery according to claim 16 in which the mat comprises a felt of small glass fibers.

18. A battery according to claim 12 in which the resealable vent has a pressure relief valve at a pressure from 1 to 20 psi.

* * * * *